(12) United States Patent
Ma et al.

(10) Patent No.: US 9,113,225 B2
(45) Date of Patent: Aug. 18, 2015

(54) METHOD AND DEVICE FOR PROVIDING MOSAIC CHANNEL

(75) Inventors: Xiaojun Ma, Beijing (CN); Junbiao Zhang, Beijing (CN); Jun Li, Cranbury, NJ (US)

(73) Assignee: Thomson Licensing (FR)

( * ) Notice: Subject to any disclaimer, the term of this patent is extended or adjusted under 35 U.S.C. 154(b) by 0 days.

(21) Appl. No.: 13/825,405

(22) PCT Filed: Sep. 30, 2010

(86) PCT No.: PCT/CN2010/001539
§ 371 (c)(1),
(2), (4) Date: Mar. 21, 2013

(87) PCT Pub. No.: WO2012/040882
PCT Pub. Date: Apr. 5, 2012

(65) Prior Publication Data
US 2013/0179921 A1    Jul. 11, 2013

(51) Int. Cl.
| | |
|---|---|
| H04N 5/445 | (2011.01) |
| G06F 3/00 | (2006.01) |
| G06F 13/00 | (2006.01) |
| G06F 15/16 | (2006.01) |
| H04N 21/63 | (2011.01) |
| H04N 21/482 | (2011.01) |
| G06Q 10/10 | (2012.01) |
| H04N 21/438 | (2011.01) |
| H04N 21/4788 | (2011.01) |

(52) U.S. Cl.
CPC ......... *H04N 21/632* (2013.01); *H04N 21/4821* (2013.01); *H04N 21/63* (2013.01); *G06Q 10/10* (2013.01); *H04N 21/4383* (2013.01); *H04N 21/4788* (2013.01)

(58) Field of Classification Search
CPC . H04N 21/63; H04N 21/632; H04N 21/4788; G06Q 10/10
USPC ............................................. 725/39; 709/205
See application file for complete search history.

(56) References Cited

U.S. PATENT DOCUMENTS

| | | |
|---|---|---|
| 2004/0231003 A1 | 11/2004 | Cooper et al. |
| 2005/0055713 A1 | 3/2005 | Lee et al. |
| 2005/0141542 A1 | 6/2005 | Handekyn et al. |

(Continued)

FOREIGN PATENT DOCUMENTS

| | | |
|---|---|---|
| CN | 1949846 | 4/2007 |
| CN | 101119474 | 2/2008 |
| JP | 2004500762 | 1/2004 |
| JP | 2005086811 | 3/2005 |
| JP | 2005160063 | 6/2005 |

(Continued)

*Primary Examiner* — Benjamin R Bruckart
*Assistant Examiner* — Akshay Doshi
(74) *Attorney, Agent, or Firm* — Jack Schwartz & Associates, PLLC

(57) ABSTRACT

A method for providing mosaic channels among multiple client devices is provided. Wherein, the multiple client devices are connected via a data communication network so as to be able to communicate data with each other. At the side of a client device, which is instructed to change to a mosaic channel while the other client device are receiving channel programs from at least one channel program server via a communication for channel programs, the method comprises the steps of receiving channel information of the channel programs from at least one of the other client devices via the communication network for channel programs; and generating a mosaic channel that comprises channel cells for presenting the channel information.

7 Claims, 10 Drawing Sheets

| Channel ID | STB ID |
|---|---|
| Channel 1 | STB2, STB5, ... |
| Channel 2 | STB1, STB4, ... |
| ... | |
| Channel m | STB3, STB6, ... |

(56) References Cited

U.S. PATENT DOCUMENTS

| | | |
|---|---|---|
| 2006/0174277 A1 | 8/2006 | Sezan et al. |
| 2007/0206622 A1* | 9/2007 | Houdaille et al. ............ 370/431 |
| 2007/0234388 A1 | 10/2007 | King |
| 2008/0066126 A1 | 3/2008 | Walter et al. |
| 2009/0019492 A1* | 1/2009 | Grasset ............................ 725/45 |
| 2009/0119703 A1 | 5/2009 | Piepenbrink et al. |
| 2009/0228943 A1 | 9/2009 | Ramaswamy et al. |
| 2009/0265737 A1* | 10/2009 | Issa et al. ........................ 725/38 |
| 2009/0327918 A1* | 12/2009 | Aaron et al. .................... 715/751 |
| 2010/0095319 A1* | 4/2010 | Tran et al. ....................... 725/14 |
| 2010/0175100 A1 | 7/2010 | Ogasawara |
| 2011/0119719 A1* | 5/2011 | Morzos ............................ 725/85 |

FOREIGN PATENT DOCUMENTS

| | | |
|---|---|---|
| JP | 2002300616 | 10/2007 |
| JP | 2007259245 | 10/2007 |
| JP | 2008182461 | 8/2008 |
| JP | 2008219311 | 9/2008 |
| JP | 2009543457 | 12/2009 |
| JP | 2010161510 | 7/2010 |
| WO | WO2005062572 | 7/2005 |
| WO | WO2007026357 | 3/2007 |
| WO | WO2008005218 | 1/2008 |
| WO | WO2008054562 | 5/2008 |
| WO | WO2008102331 | 8/2008 |
| WO | WO2011059874 | 5/2011 |

\* cited by examiner

| Layer 4 | Statistic Collection and Offering |
| Layer 3 | Mosaic Presentation |
| Layer 2 | Mosaic Distribution |
| Layer 1 | Mosaic Generation |

Fig. 3

| Channel ID | STB ID |
|---|---|
| Channel 1 | STB2, STB5, ... |
| Channel 2 | STB1, STB4, ... |
| ... | |
| Channel m | STB3, STB6, ... |

Fig. 4

| Channel ID | STB |
|---|---|
| Channel 1 | (STB2, Active_Time), (STB5, Active_Time), ... |
| Channel 2 | (STB1, Active_Time), (STB4, Active_Time), ... |
| ... | |
| Channel m | (STB3, Active_Time), (STB6, Active_Time), ... |

Fig. 7

| Message_Type | Message |
| --- | --- |
| 0 | MHMS subscription request |
| 1 | response to MHMS subscription request |
| 2 | MHMS un-subscription request |
| 3 | response to MHMS un-subscription request |
| 4 | Alive message |
| 5 | Response to alive message |
| 6 | Channel change message |
| 7 | Response to Channel change message |
| 8 | Representative notification |
| 9 | Response to representative notification |

Fig. 9

| Channel ID | STB |
|---|---|
| Channel 1 | (STB2, Active_Time), (STB5, Active_Time), ..., *(STB7, Active_Time)* |
| Channel 2 | (STB1, Active_Time), (STB4, Active_Time), ... |
| ... | |
| Channel m | (STB3, Active_Time), (STB6, Active_Time), ... |

Fig. 10

| Channel ID | STB |
|---|---|
| Channel 1 | (STB2, Active_Time), ..., (STB7, Active_Time) |
| Channel 2 | (STB1, Active_Time), (STB4, Active_Time), ..., , *(STB5, Active_Time)* |
| ... | |
| Channel m | (STB3, Active_Time), (STB6, Active_Time), ... |

Fig. 11

METHOD AND DEVICE FOR PROVIDING MOSAIC CHANNEL

This application claims the benefit, under 35 U.S.C. §365 of International Application PCT/CN2010/001539, filed Sep. 30, 2010, which was published in accordance with PCT Article 21(2) on Apr. 5, 2012 in English.

TECHNICAL FIELD

The present invention relates to video system, and more particularly, to a method and a device for providing mosaic channel.

BACKGROUND

With the technology development, one or more mosaic channels are provided by broadcaster. It allows users to get a clear and convenient overview of current TV broadcasts without manually zapping. A mosaic channel often contains a mosaic view of a collection of elements (usually channels); the representation of elements can be static or dynamic. By "static", it means a picture captured from the video in each of other channels; by "dynamic", it means a video stream retrieved from the video in each of other channels. In some systems, the user can turn to his desired channel by selecting the corresponding channel avatar within the mosaic channel.

For example, WO/2007/030380 discloses an interactive mosaic channel video stream with indicators as to the action on a given video stream. The interactive mosaic channel is displayed on a video monitor, with a plurality of individual video feeds being presented at a given time, comprising a plurality of video cells presenting at least video information, each video cell associated with one of the plurality of individual video feeds, each video cell further comprising an area within the video cell reporting data related to the video feed, and a cursor, which can be moved between the plurality of video cells, for selecting at least one characteristic associated with a selected video cell, such that the user can then directly select a video program associated with the selected video cell However, the conventional mosaic channel is prepared at the side of the broadcaster and transmitted to user devices.

SUMMARY

According to an aspect of present invention, it is provided a method for providing mosaic channel among multiple client devices. Wherein, the multiple client devices are connected via a data communication network so as to be able to communicate data with each other. At the side of a client device, which is instructed to change to a mosaic channel while the other client devices are receiving channel program from at least one channel program servers via a communication network for channel programs, the method comprises the steps of receiving channel information of the channel programs from at least one of the other client devices via the communication network for channel programs; and generating a mosaic channel that comprises channel cells for presenting the channel information.

According to an aspect of the present invention, it is provided a client device for providing mosaic channel. Wherein, the client device is connected via a data communication network to multiple client devices so as to communicate data with them, the client device comprises a first interface configured to receive channel programs from at least one channel program server; a second interface configured to connect to the data communication network; and a processor configured to receive channel information of channel programs from at least one of the multiple client devices via the second interface, and generate a mosaic channel the comprise channel cells for presenting the channel information.

It is to be understood that more aspects and advantages of the invention will be found in the following detailed description of the present invention.

BRIEF DESCRIPTION OF THE DRAWINGS

The accompanying drawings, which are included to provide a further understanding of the, illustrate embodiments of the invention together with the description which serves to explain the principle of the invention. Therefore, the invention is not limited to the embodiments. In the drawings:

FIG. 3 is a diagram showing an example of a layer model of the mosaic channels according to the embodiment of present invention;

FIG. 4 is shows an example of a STB and channel mapping table according to the embodiment of present invention;

FIG. 7 shows another example of the STB and channel mapping table according to the embodiment of present invention;

FIG. 9 shows an example of a table of message type according to the embodiment of present invention;

FIG. 10 shows an example of the STB and channel mapping table after STB 7's subscription according to the embodiment of present invention;

FIG. 11 shows an example of the STB and channel mapping table after a channel change message is received according to the embodiment of present invention;

DETAILED DESCRIPTION

An embodiment of the present invention will now be described in detail in conjunction with the drawings. In the following description, some detailed descriptions of known functions and configurations may be omitted for clarity and conciseness.

Figure 2:
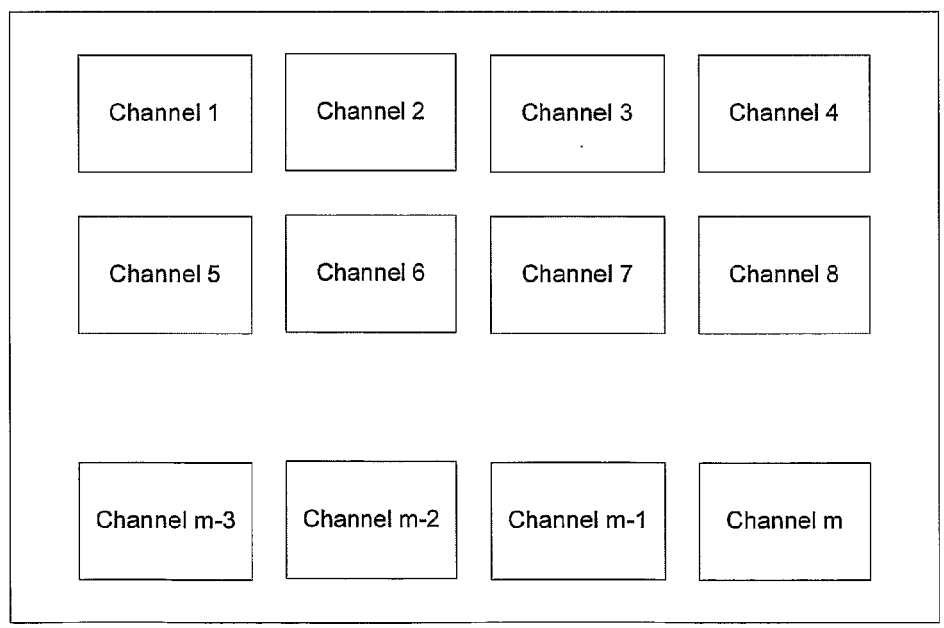
FIG. 2 is a diagram showing an example of layout of channel information cells according to the embodiment of present invention.

The present invention provides a method for providing one or more mosaic channels without needing the one or more mosaic channels prepared at the broadcaster end, which therefore can save the cost for deploying a mosaic system for preparing mosaic channel(s) at the broadcaster end. Specifically, one or more mosaic channels are provided at the user end to present mosaic view of video information for multiple TV channels, wherein, the video information of the multiple TV channels is directly or indirectly contributed by STBs receiving the contents of the multiple TV channels. By "directly", it means other STBs send video information to the STB displaying the mosaic channel; by "indirectly", it means other STBs send video information to a certain device in the network, and the certain device prepares the mosaic channel and sends the mosaic channel to the STB intending to display the mosaic channel. FIG. 2 is a diagram showing an example of a mosaic channel according to the embodiment, which serves to explain the principle of the invention and shall not be used to limit the invention. In this example, a single page of the mosaic channel gives viewers a clear and convenient overview of m channels by means of listing m cells, each of which is associated with one of the m channels and presents video information of its corresponding channel. The video information can be dynamic information (e.g. video stream) or static information (e.g. a picture or a screen snapshot captured from the video stream corresponding to a channel).

Figure 1:
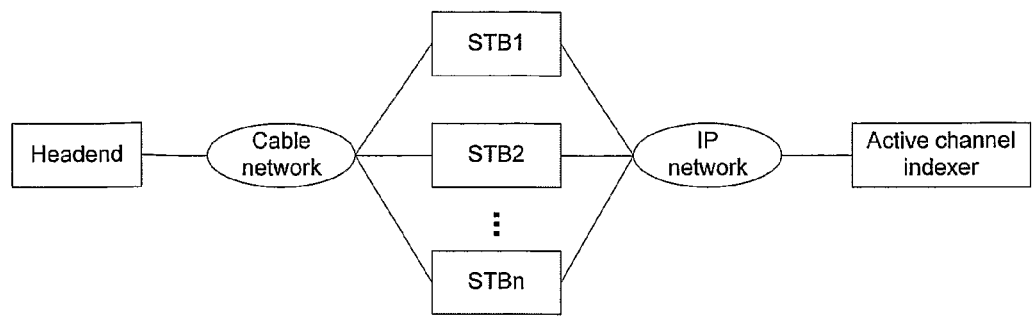
FIG. 1 is a diagram illustrating an example of a system for providing mosaic channel(s) according to an embodiment of present invention.

FIG. 1 is a diagram illustrating an example of a system for providing mosaic channel(s) according to an embodiment of present invention. It shall note that this example is for the purpose of illustrating the aspect of the invention, and shall not used to limit the invention. In this example, the system comprises two networks, i.e. a network for providing TV channels, e.g. broadcast TV (cable or satellite) network, and a network for providing data communication, e.g. IP (Internet Protocol) network. As can be seen from the FIG. 1, the system further comprises at least one broadcaster for providing contents of TV channels, multiple STBs (set top box) and a mosaic channel server named active channel indexer. The active channel indexer is a server connecting to the IP network and maintaining a STB and channel mapping table, and more details can be found in below description. The STB in this example has at least two network interfaces, i.e. a TV network interface and an IP network interface connecting to cable network and IP network, respectively. The STBs can communicate with each other via IP network. In addition to STB's current functions of receiving data of TV channels from cable network, the STB is further designed to convert data of its current channel into a low resolution stream and transmit the low resolution stream to the IP network. The transmission can be by means of either multicast or unicast. Further, the STB can receive low resolution streams sent by other STBs via the IP network interface, and compile one or more mosaic channels according to a predefined rule. For example, the rule can be that the video information of all channels is arranged in a single mosaic channel, or in consecutive pages of a mosaic channel. Sometimes, the consecutive pages of a mosaic channel can be implemented as multiple mosaic channels. In addition, it is possible that as to some channels, no STB is watching them, and consequently, there are no low bit resolution streams of them available in the IP network. Thus, there are 3 ways to deal with non-available channels. The video information of non-available channels can be left void, e.g. the video cells corresponding to these non-available channels are filled in black; or the arrangement of the video information is altered in a way that video cells corresponding to the non-available channels are placed to the back; or the STB of displaying the mosaic channel obtains the video information from a third party server in the IP network.

According to a variant, the video cells can be grouped by either individual STB or a third party device, so that each group corresponds to a particular topic, e.g. sports channels, or corresponds to a person's favorite collection of TV channels. And consequently, upon reception of an instruction to display a mosaic channel for a particular topic, e.g. a sports mosaic channel, the STB only needs to retrieve the data streams of TV channels contained in the sports mosaic channel. The group information can be stored in either a storage module of the STB or a storage module of the third party device. The group information at least comprises a group identity uniquely identifying a group, channels information about which channels are included into the group. The channels information can be the channel identity that uniquely identifies a channel. According to a variant, each STB corresponds to a set of group information so that each STB can customize its configuration/arrangement of the mosaic channel(s). According to a variant, the system provides a mechanism allowing STBs to join (subscribe to) and/or leave (unsubscribe to) some groups regardless of whoever among STB users and a third party device creates the groups. And correspondingly, there is a database recording the relationship between STBs and mosaic groups. It shall note that the relationship between STBs and mosaic groups can be integrated into the database for recording the group information. i.e. a table containing 3 fields of group identity, channel identity, and STB identity. Besides, the STB may know the relationship so that it knows what to receive and how to arrange the video cells in a mosaic channel. The relationship can be received and stored in the STB, and updated when changes are made, e.g. addition of a new channel to a group, removal of an existing channel from a group etc., or the relationship can be transferred to the STB when the STB is instructed to display a mosaic channel.

FIG. 3 is a diagram showing an example of a layer model of the mosaic channels according to the present embodiment. The layer model includes four layers. The first layer is mosaic generation layer, for which all mosaics are generated by participating STB of the corresponding groups. It means that in multicast network for each channel, only a representative STB is selected to generate the corresponding mosaic and further make contribution to the group; in P2P network, for each channel, according to the certain rule, some of STBs of the group may be requested to generate the mosaic and send to other peers. The second layer is mosaic distribution layer, for which the mosaic may be distributed in either multicast or P2P manner depending on which distribution technology is supported by the underlying network. The third layer is mosaic presentation layer for presenting mosaic on the STB. It is flexible and there are various ways to present the mosaic, e.g., it can be presented based on viewers' favorite topic such as sports. The fourth layer is statistic collection and offering layer. Since the information of channel switch by each STB is required to be sent to the active channel indexer, it is easy for TV service providers or a third party to get the statistics of channel popularities from the active channel indexer, which can be used for analyzing user's viewing preference even in a special time slot. Based on the contribution and information shared among the STBs, statistics, such as channel popularities, can be easily collected and offered to all viewers as for the indication of user preferences, recommendations, etc.

FIG. 4 shows an example of a STB and channel mapping table according to the present embodiment. As shown, the mapping table maintains the information about which STB is playing which TV channel. Herein, we define an active channel as a channel that is being played by at least one STB. For multicast supported IP network, STB and channel mapping information is used to help find a representative STB for each active channel. The representative STB is responsible for transcoding the channel program into a low resolution stream and transmitting the stream to the IP network. For a P2P network, the table provides a particular peer with a list of peers that can be used by peer lookup. And among the list peers one peer is chosen to transcode the channel program into a low resolution stream, and transmit the stream to the particular peer. For multicast supported IP network, the rule for selecting a representative STB for a particular channel includes:

1. Using the first STB tuning to the particular channel as the representative STB, and when the first STB fails or leaves, using the second STB. This process repeats unless there is no STB tuning to the particular channel; and
2. Randomly choosing a STB as the representative STB.

Every STB shall register itself to the active channel indexer when it powers on. After the registration, a STB will be able to get the mosaic channel or be chosen as a representative STB for transmitting a low resolution stream. According to a variant, a STB may not want to be chosen as a representative STB for transmitting the low resolution stream but still want to receive a mosaic view of TV channels. In this circumstance, the STB does not need to register itself, and when it intends to receive the mosaic view, the STB sends an instruction to get information on how to receive the mosaic view from a server, e.g. the active channel indexer.

As long as a STB performs a valid channel switch, the corresponding STB shall notify the active channel indexer of its valid channel switch, e.g. by sending a message including the channel ID uniquely identifying the switched channel and the STB ID. It shall note we use valid channel switch here to make it distinguished from general channel surfing. Since sometimes a viewer may incline to perform quick channel surfing so as to find a favorite program, we should avoid sending a message for each channel switch action in channel surfing. A report should be sent out only when a valid channel switch action is performed, e.g., only after the viewer keeps staying at a channel at least for 15 seconds. However, there are no uniform criteria for defining what a valid channel switch is. Other criteria may be applied, e.g., after the viewer keeps staying at a channel at least for 10 seconds, etc.

Figure 5:
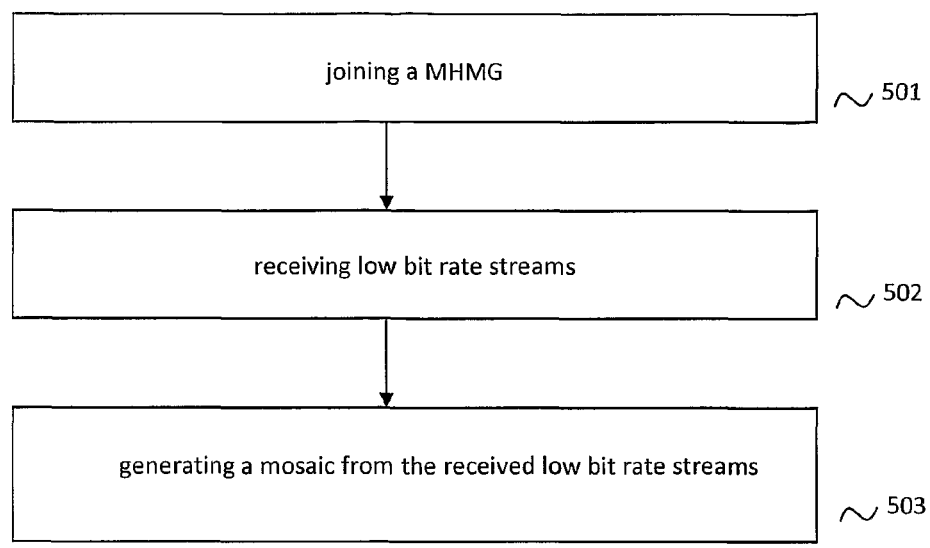
FIG. 5 is a flow chart illustrating an example of a method for receiving a mosaic channel according to the embodiment of present invention.

FIG. 5 is a flow chart illustrating an example of a method for receiving a mosaic channel according to the present embodiment. This example divides STBs into groups. Here, we nominate the group as multiple household mosaic group (MHMG). There are various ways of forming such MHMG. For example, the MHMGs are predefined based on user region, i.e. a group of STBs within an area form an MHMG. In addition, one or more MHMGs are created by a mosaic service provider or STB users for particular themes, e.g. sports, news etc., and it allows STBs to subscribe or unsubscribe to (join or leave) one or more MHMGs. The information about MHMGs and that which STB subscribes to which MHMG is stored in a server accessible to all STBs. The server can be the active channel indexer.

In the step 501, a STB joins an MHMG. Before the STB joins, the MHMG may include several member STBs;

In the step 502, the STB receives low bit rate streams from other member STBs, these low bit rate streams are generated by the other member STBs from data stream received via cable interface;

In the step 503, the STB generates a mosaic view from the received low bit rate streams. In the mosaic view, multiple video cells are used to present the content of the low bit rate streams. Sometimes, two or more member STBs may receive the same TV channels. In this circumstance, we can either discard late received one or two streams and only use the first received stream, or request the two or more member STBs to select a representative STB to transmit its stream.

According to a variant, besides low bit rate stream, we can also use low resolution stream converted from the cable network's data stream, a picture of currently displayed video, and multiple pictures sampled from the video etc. And correspondingly, the cells in the mosaic view only show static pictures when the member STBs each send a captured picture. In addition, if bandwidth permits, we can even directly use the cable network's data stream without any conversion.

According to a variant, there may be multiple MHMGs for different themes. An MHMG may be indexed by a multicast address if multicast transmission is supported by the IP network. Otherwise, MHMG may be indexed by a special unicast address or domain name if the IP network (e.g., Internet) does not support multicast transmission, and in this case technologies such as application layer multicast or P2P transmission can be used. The MHMG information of a STB can be preconfigured or dynamically retrieved from the active channel indexer.

In addition, an MHMG can be predefined to include multiple specific TV channels. When a STB joins an MHMG of this type and intends to switch to the mosaic view, it will receive data from other member STBs of this MHMG.

Figure 6:
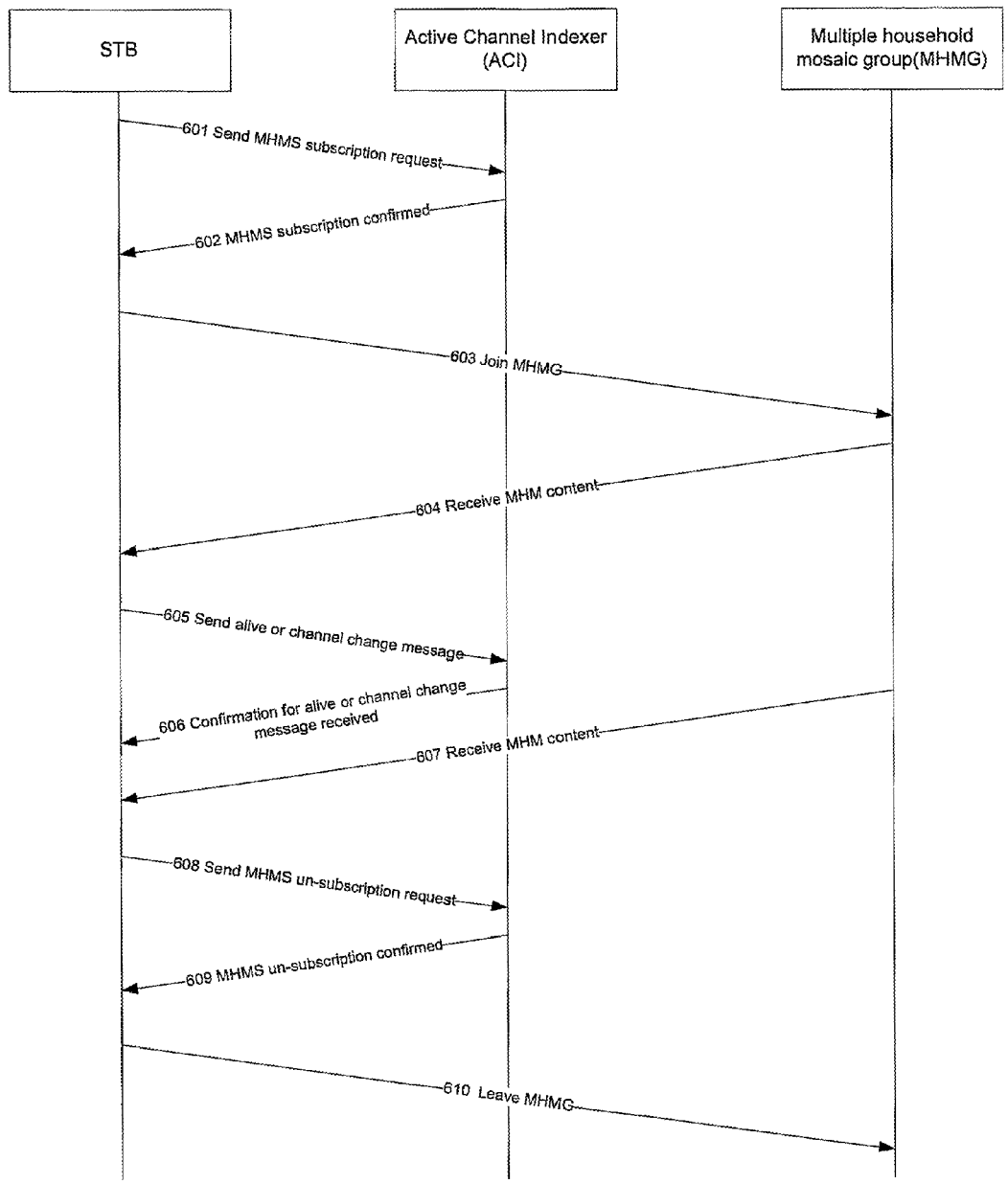
FIG. 6 is a signaling sequence chart illustrating an example of a STB's joining and leaving an MHMG according to the embodiment of present invention.

FIG. 6 is a signaling sequence chart illustrating an example of a STB's joining and leaving an MHMG according to the present embodiment. For the purpose of clarity and conciseness, only changes made to the system, i.e. messages exchanged among the STB, the Active Channel Indexer (ACI) and the MHMG are described.

In the step 601, the STB sends a request to Active Channel Indexer (ACI) indicating its interest of subscribing multiple household mosaic service (MHMS). The MHMS subscription request may contain at least following fields.

1. Message_Type
2. STB_ID
3. Active_Channel

Herein, Setting Message_Type 0 indicates it is a MHMS subscription request. And STB_ID and Active_Channel are used to indicate the STB's unique identity and its active channel. FIG. 9 shows a table of message type. According to a variant, the Active_Channel field may be unnecessary when the STB does not need to provide a low bit rate stream of its current TV program.

In the step 602, the ACI confirms the subscription to the STB. The confirmation includes at least following fields.

1. Message_Type
2. STB_ID
3. Subscription_Flag
4. MHMG_address

Herein, setting Message_Type 1 indicates it is a response to MHMS subscription request; setting Subscription_Flag 1 denotes subscription succeeds and setting Subscription_Flag 0 denotes subscription fails. The MHMG_address is the multicast address of multiple household mosaic group (MHMG), e.g., 239.1.1.1.

In case of a successful subscription, the ACI shall update the STB and channel mapping table. The FIG. 7 shows another example of the STB and channel mapping table according to the present embodiment. As shown in the FIG. 7, there is a list of STBs corresponding to each channel, e.g., STB 2 and STB 5 are currently at channel 1, while STB 1 and STB 4 are at channel 2, etc. It shall note that in this example each item is a 2-tuple set which contains the STB_ID and the Active_Time. The Active_Time can be used to denote the latest time when ACI receives the channel information from the STB. The Active_Time shall be updated when any one of the following events happens, 1. ACI receives a MHMS subscription request from one STB.
2. ACI receives an alive message from one STB.
3. ACI receives a channel change message from one STB.

4. ACI receives an MHMS un-subscription request from one STB.

The Active_Time is retrieved locally by ACI when it receives any of the above events. When receiving a subscription or a channel change event, ACI will accordingly update the Active_Time of corresponding STB; when receiving an un-subscription event, ACI will remove the 2-tuple item of the corresponding STB from the STB and channel mapping table. For each STB that has subscribed MHMS, it shall periodically send alive message to ACI indicating it is still alive and active channel ID. A person skilled in the art shall appreciate that it's not necessarily requesting all STBs to send alive messages.

In the step 603, the STB joins the MHMG. For a multicast supported network to join the MHMG, the STB just needs to send an IGMP (Internet Group Management Protocol) Join Group Request to the multicast group. For P2P network, a specific protocol may be designed to join and leave. Due to the active channel indexer, such join and leave can be easily designed and understood between ACI and STBs.

In the step 604, the STB receives multiple household mosaic (MHM) content from MHMG, decodes the content and compiles the mosaic channel. The layout of channel information cells can refer to that in the FIG. 2. Since a STB may receive data streams from multiple member STBs within the same MHMG simultaneously, it is necessary to differentiate data streams from each other because the data streams will be used later to create video cells in the mosaic channel respectively. Note when the multicast is used, data is transmitted with a multicast address plus a transport port number in the packet header. Therefore, a simple way is to transmit mosaic content of different TV program channels to different transport port numbers, e.g., channel 1 is transmitted to multicast address 226.1.1.1 with port 10001; channel 2 is transmitted to multicast address 226.1.1.1 with port 10002; channel 3 is transmitted to multicast address 226.1.1.1 with port 10003; etc. The only requirement is that each STB should get a channel and port number mapping table, which can be predefined and retrieved from the ACI, and consequently, the STB can use these information to generate the mosaic view of TV channels.

In the step 605, the STB sends an alive message periodically to the ACI indicating it is still alive and its active channel ID, or sends channel change message in case the viewer changes the TV channel. Regarding the alive message, the period of sending alive message can be pre-defined, e.g., every 30 seconds. The alive message shall contain following information.
1. Message_Type
2. STB_ID
3. Active_Channel Herein, setting Message_Type 4 indicates it is an alive message.

Once receiving an alive message from a STB, the ACI shall update the corresponding 2-tuple item of the STB in the STB and channel mapping table. It shall note the Active_Time is set to the ACI's local time when receiving the alive message.

Regarding the channel change message, it contains following information,
1. Message_Type
2. STB_ID
3. Active_Channel Herein, setting Message_Type 6 indicates it is a channel change message.

Figure 8:
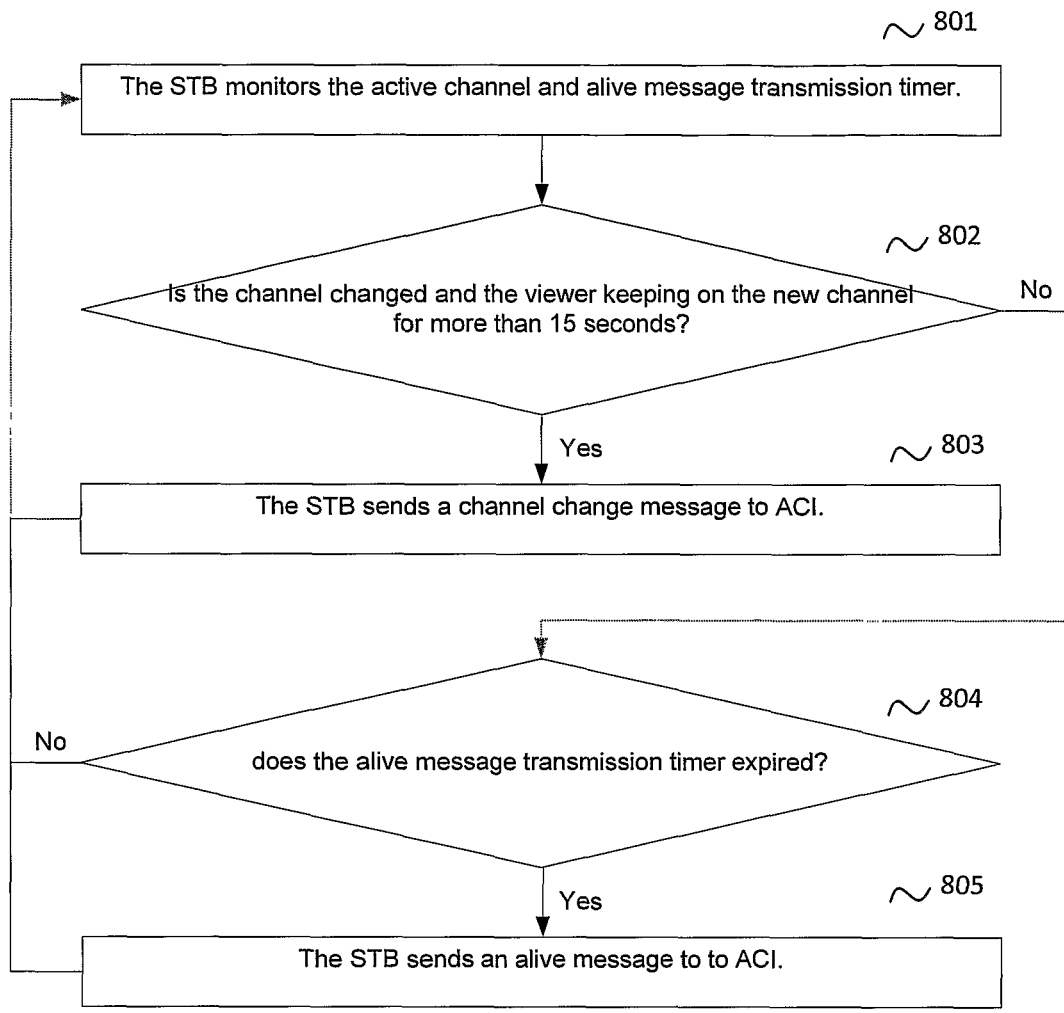
FIG. 8 is a flow chart illustrating the workflow for a STB to send a channel change or an alive message to the ACI according to the embodiment of present invention.

It shall note that it is possible for a viewer to perform a quick channel surfing. In order to avoid sending useless messages caused by e.g., (quick) channel surfing, an additional rule may be applied, e.g., a channel change message is sent only after the STB stays at a channel for 15 seconds. FIG. 8 is a flow chart illustrating the workflow for a STB to send a channel change or an alive message to the ACI according to the present embodiment. In the step 801, the STB monitors the active channel and alive message transmission timer. In the step 802, the STB determines if the channel is changed and if the viewer keeps on the new channel for more than 15 sec after the channel change. If both answer is yes, the STB sends a channel change message to the ACI. Or otherwise, the STB determines if the alive message transmission timer expire in the step 804. If the timer expires, the STB sends an alive message to the ACI. Or otherwise, the STB keeps monitoring the alive message transmission timer. A person skilled in the art shall appreciate that the method in the FIG. 8 is just a possible implementation, other implementations can also possible. For example, the STB monitors the active channel and the alive message transmission timer separately.

In the step 606, after the ACI receives an alive message or a channel change message from a STB, the ACI sends back a confirmation message to the STB and updates the corresponding 2-tuple item in the STB and channel mapping table. The confirmation message contains following fields.
1. Message_Type
2. STB_ID
3. Active_Channel Herein, setting Message_Type 5 indicates it is a response to an alive message, and setting Message_Type 7 indicates it is a response to a channel change message.

In the step 607, after the STB's changing to a new channel or transmission of an alive message, the STB continues receiving the MHM content from the MHMG, decodes the content and compiles the mosaic channel.

In the step 608, the STB sends an MHMS un-subscription request to the ACI indicating its desire of un-subscribing MHMS. The MHMS un-subscription request may contain at least following fields.
1. Message_Type
2. STB_ID
3. Active_Channel Herein, setting Message_Type 2 indicates it is an MHMS un-subscription request.

In the step 609, the ACI confirms the un-subscription to the STB. The confirmation includes at least following fields.
1. Message_Type
2. STB_ID
3. Un-subscription_Flag Herein, setting Message_Type 3 indicates it is a response to an MHMS un-subscription request. Setting Un-subscription_Flag 1 denotes subscription succeeds and setting Subscription_Flag 0 denotes subscription fails.

In Step 610, the STB leaves MHMG.

It can be seen from the above example that the STB keeps receiving MHM content and compiling the mosaic view for the mosaic channel irrespective of whether it is at the mosaic channel or not. According to a variant, only when the STB is turned to the mosaic channel, it will decode the received streams and generate the mosaic view for the mosaic channel.

Regarding the channel number assignment for TV channels from cable network and mosaic channel(s), each TV channel is assigned a channel number, such as channel 1, channel 2, etc., and the mosaic channel can be assigned a specific number, e.g., channel 0 or channel 999. According to a variant, a special key can be implemented on the remote control so as to facilitate fast switching to mosaic channel.

When the STB is tuned into a mosaic channel, a user may use right/left/up/down/page-up/page-down keys on the STB remote controller to browse the mosaic channel. If the user decides to switch to a certain channel, he/she may first move to the corresponding mosaic by using right/left/up/down and then press OK key to request STB to switch to desired channel. Alternatively, if the user finds one interesting channel when browsing the mosaic channel, he/she may input a number, e.g., 10 to directly switch to channel 10. In order to implement this function, each STB contributing low bit rate stream adds channel information, e.g. channel ID into the stream so that the STB receiving the streams can know the chosen cell by a user corresponds to which TV channel. Besides, the cell can be configured to show the channel information, a particular region in the screen, e.g. at the bottom of the screen, is configured to show the channel information so that the user can directly use remote to input a channel number.

For any STB that subscribes to the MHMS, it not only receives MHM content but is obliged to make contribution to MHMG by transcoding active channel program to lower bit stream and transmitting it to MHMG when needed. It should be noted that for a multicast supported network, only one STB is selected by the active channel indexer as the channel representative is required to make contribution. For P2P network, a STB performs the low bit rate stream transcoding and transmission when it is requested by a peer STB. A STB may request multiple low bit rate streams from multiple peer STBs, and each stream is corresponding to one TV channel. The information about which peer STB plays which TV channel can be obtained from a server to which each STB registers its channel information to.

ACI shall update the STB/Channel mapping table whenever it receives any one type of following messages from any SIB.
1. MHMS subscription request
2. MHMS un-subscription request
3. Alive message
4. Channel change message On reception of a MHMS subscription request, ACI will add a 2-tuple item into the STB/Channel mapping table. For example, when receiving a MHMS subscription request from STB 7 with active channel 1 piggybacked, the ACI will add a 2-tuple item (STB7, Active_Time) in the list corresponding to channel 1. FIG. 10 shows an example of the STB and channel mapping table after STB 7's subscription.

On reception of an MHMS un-subscription request, the ACI will remove the 2-tuple item of the STB in the STB and channel mapping table.

On reception of an alive message, the ACI will update the Active_Time of the 2-tuple item of the STB in the STB and channel mapping table. The Active_Time is the local time of the ACI when it receives the alive message.

On reception of a channel change message, the ACI will remove the corresponding 2-tuple item of the STB from its previous channel list and add a new one to the new channel list. For example, when receiving a channel change message from STB 5 indicating its channel change from channel 1 to channel 2, ACI will remove the 2-tuple item of the STB 5 from the channel 1 list and add one to the channel 2 list as shown by FIG. 11.

For multicast supported network, the active channel indexer is responsible for selecting a representative STB and backup STB for each active channel. If the current representative is not available for contribution due to shut down or channel switch, a backup STB immediately informed by ACI to take over the representative responsibility. There are various criteria for selecting representative and backup representative of each channel, e.g, random selection from the channel list or select the first node of the channel list, etc.

Figure 12:
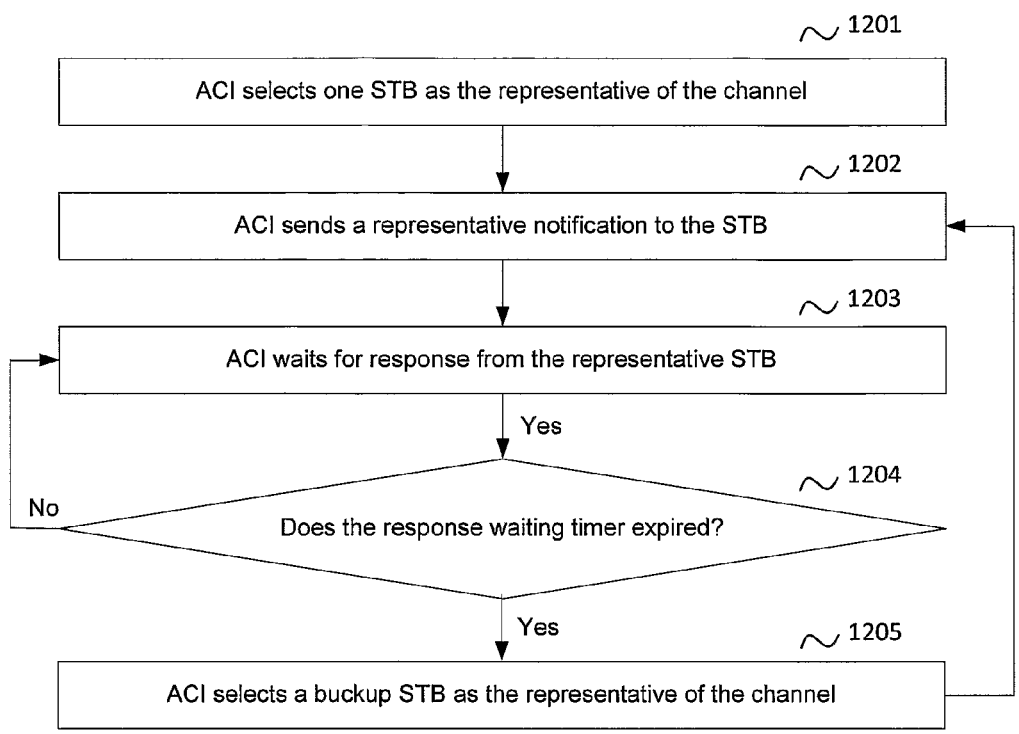
FIG. 12 is a flow chart illustrating a method for selecting a representative STB for a channel according to the embodiment of present invention.

Once the ACI determines to select one STB as the representative of one channel, it shall inform the STB to make contribution to MHMG by sending a representative notification to the STB indicating it has been chosen as the representative STB for its currently viewing TV channel. The representative STB shall reply to the ACI with a response to representative notification. FIG. 12 shows a flow chart illustrating a method for selecting a representative STB for a channel. In the step 1201, the ACI selects a STB as the representative STB for each channel based on the STB and channel mapping table. In the step 1202, the ACI sends a representative notification to the selected STB, and sets a response waiting timer. In the step 1203, the ACI waits for a response from the representative STB. In the step 1204, the ACI monitors whether the response waiting timer expires during waiting for the response. If it does not expire, the ACI still waits for the response. When the response is received, the ACI will cancel the timer. If it expires, the ACI will, in the step 1205 select a backup STB as the representative STB of the channel. The backup STB is selected in a way the same as the above. The reason for setting a timer is because the ACI may not be possible to receive the response from the selected STB due to some reasons such as the STB shutdown, crashed or other exceptional issues. In this case, the ACI is able to select another STB to be the representative. The response waiting timer can be predefined, e.g., 1 second or 500 ms.

According to a variant, as to the P2P network, the active channel indexer provides lookup services for MHMG members. MHMG member STBs can get channel and peer information from it.

In addition, since the active channel indexer knows the active channel information of all MHMG members, the statistics of popular channels and audience rating can be easily obtained and provided to MHMG members or TV service provider.

Further, the method provided by the present invention can be not only applied to traditional broadcasting system such as cable or satellite TV, but instinctively applied to IPTV system.

According to a variant of present embodiment, the two networks can be a single network. That's, it's a single network for providing delivery of TV channels and data communication. For example, it can be an IP network used for delivering both data packets encapsulating contents of TV channels and data packets for data communication.

According to a variant of present embodiment, the active channel indexer is not included in the system. In this case, the STBs shall themselves maintain such information, e.g. every STB has a copy of such information, and when such information is changed, the change shall be notified to all STBs.

According to a variant of present embodiment, the channel programs are divided into several channel groups, each group corresponding to a mosaic channel. The information about the channel groups is also stored in the ACI. When a STB tunes to a mosaic channel corresponding to a particular channel group, e.g. sports mosaic channel, the STB receives channel information from other STB being receiving channel programs of the particular channel group.

Figure 13:
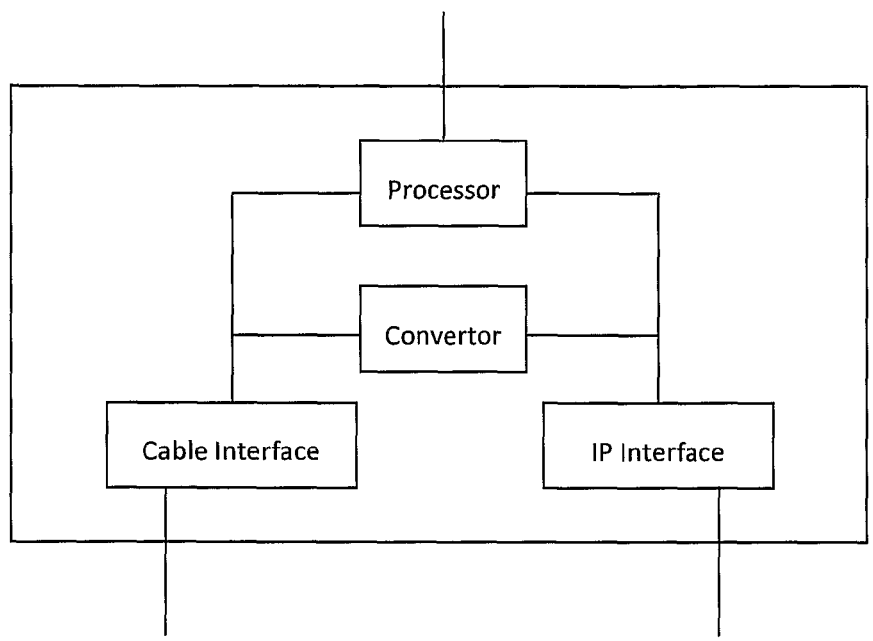
FIG. 13 is a block diagram illustrating a STB according to the embodiment of present invention.

FIG. 13 is a block diagram illustrating a STB according to the present embodiment. The STB contains a cable interface and an IP interface connecting to cable network and IP network respectively, a convertor and a processor. The cable interface is used to receive data streams of TV channels from TV channel provider, and the IP interface is used to send and receive data encapsulated in IP packets. The convertor is used to carry out format conversion, e.g. converting the data stream of a TV channel into a low resolution data stream, or capturing a single picture or a sequence of pictures from the decoded content of the TV channel. It can be seen from the FIG. 13 that the input is from cable interface and the output is to the IP interface. The IP interface is configured to receive signaling information, control information and data from other STBs, and send converted low resolution data stream to the network in either multicast mode or unicast mode. In some implementations, when the STB is not chosen as the representative STB, it does not need to carry out the conversion and transmit the converted stream. The processor is used to decode and present the contents of the TV channel when user is viewing the TV channel, and when the STB is tuned to the mosaic channel, generating a mosaic view of TV channels based on data streams received via the IP interface. Additionally, when a user browses a mosaic channel and makes a selection on a video cell within the mosaic channel, the processor is configured to tune the STB to a TV channel corresponding to the selected video cell. Other description of these modules can refer to the aforementioned description of the method.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations shall fall in the scope of the invention.

The invention claimed is:

1. A method for providing a mosaic view among multiple client devices, wherein at the side of a client device, the method comprises:
   receiving an instruction for changing to the mosaic view;
   receiving channel information of at least one channel program received by one or more other client devices, via a data communication network, through which all client devices are connected, wherein channel information of each channel program is received via IP layer multicast and for each channel program among the at least one channel program that is being received by at least two client devices, selecting only one client device from the at least two client devices as a representative client device to send channel information of the channel program via IP layer multicast; and
   generating, at the client device, the mosaic view that comprises mosaic cells received from different representative client devices as a low resolution stream for presenting the channel information wherein the channel information is a picture or multiple pictures captured by a client device sending the channel information from the channel program the client device is receiving.

2. The method of claim 1, wherein the multiple client devices are grouped into multiple groups, wherein the client device changing to the mosaic view only receives channel information from client devices of its group.

3. The method of claim 1, wherein the channel programs are grouped into multiple channel groups, and each channel group corresponds to a mosaic view, wherein, the client device changing to the mosaic view corresponding to a channel group receives channel information from client devices receiving channel programs of the channel group.

4. The method of claim 1, further comprising when the client device is receiving a channel program via the communication network, sending, by the client device, channel information of the channel program via the data communication network.

5. The method of claim 1, wherein the channel information is a low resolution stream that is converted, by a client device sending the channel information, from the channel program the client device is receiving.

6. The method of claim 1, wherein the mosaic view is provided in a channel.

7. A client device for providing a mosaic view, wherein the client device is connected via a data communication network to multiple client devices so as to communicate data with them, the client device comprises:
   a first interface configured to receive at least one channel program from at least one channel program server;
   a second interface configured to connect to the data communication network; and
   a processor configured to receive channel information of the at least one channel program from at least one of the multiple client devices via the second interface, and generate, at the client device, the mosaic view including mosaic cells received from different representative client devices for presenting the channel information, wherein channel information of each channel program is received via IP layer multicast and, for each channel program among the at least one channel program that is being received by at least two client devices, select only one client device from the at least two client devices as a representative client device to send channel information of the channel program via IP layer multicast; and
   a convertor configured to convert the channel program into a low resolution stream, or capture a picture or multiple pictures from the channel program, and the processor is further configured to send the low resolution stream, captured picture or captured multiple pictures via the second interface.

* * * * *